(12) United States Patent
Bassill et al.

(10) Patent No.: US 12,137,511 B2
(45) Date of Patent: *Nov. 5, 2024

(54) PATTERN RECOGNIZING APPLIANCE

(71) Applicant: Hatco Corporation, Milwaukee, WI (US)

(72) Inventors: Nick Bassill, Milwaukee, WI (US); John Scanlon, Milwaukee, WI (US); Ishan Shah, Milwaukee, WI (US); Fei Shang, Milwaukee, WI (US); Max Walker, Milwaukee, WI (US)

(73) Assignee: Hatco Corporation, Milwaukee, WI (US)

( * ) Notice: Subject to any disclaimer, the term of this patent is extended or adjusted under 35 U.S.C. 154(b) by 24 days.

This patent is subject to a terminal disclaimer.

(21) Appl. No.: 17/826,625

(22) Filed: May 27, 2022

(65) Prior Publication Data

US 2022/0295609 A1 Sep. 15, 2022

Related U.S. Application Data

(63) Continuation of application No. 15/984,006, filed on May 18, 2018, now Pat. No. 11,375,587.
(Continued)

(51) Int. Cl.
*A47J 36/32* (2006.01)
*A47J 27/00* (2006.01)
(Continued)

(52) U.S. Cl.
CPC ............ *H05B 6/687* (2013.01); *A47J 27/004* (2013.01); *A47J 36/32* (2013.01); *A47J 36/321* (2018.08); *A47J 37/045* (2013.01); *A47J 37/08* (2013.01); *A47J 37/0871* (2013.01); *H05B 6/6438* (2013.01); *H05B 6/6441* (2013.01); *H05B 6/6455* (2013.01); *H05B 6/6458* (2013.01); *H05B 6/6464* (2013.01); *H05B 6/668* (2013.01); *H05B 6/782* (2013.01)

(58) Field of Classification Search
None
See application file for complete search history.

(56) References Cited

U.S. PATENT DOCUMENTS

| 3,456,578 A | * | 7/1969 | William | A47J 37/044 |
| | | | | 99/443 C |
| 4,717,572 A | | 1/1988 | Buller-Colthurst | |

(Continued)

*Primary Examiner* — Edelmira Bosques
*Assistant Examiner* — Deepak A Deean
(74) *Attorney, Agent, or Firm* — Foley & Lardner LLP

(57) ABSTRACT

A food preparation appliance includes a housing, a conveyor, a thermal element, a first sensor, a second sensor, and a third sensor. The housing defines an inlet, an outlet, and a processing zone between the inlet and the outlet. The conveyor is configured to move a food product from the inlet, through the processing zone, and to the outlet. The thermal element is positioned within the processing zone. The first sensor is positioned proximate the inlet of the housing and along a lateral side of the conveyor or along a first cantilever arm extending laterally across the conveyor. The second sensor is positioned within the processing zone. The third sensor is positioned proximate the outlet of the housing and along a lateral side of the conveyor or along a second cantilever arm extending laterally across the conveyor.

18 Claims, 5 Drawing Sheets

Related U.S. Application Data

(60) Provisional application No. 62/508,822, filed on May 19, 2017.

(51) Int. Cl.
*A47J 37/04* (2006.01)
*A47J 37/08* (2006.01)
*H05B 6/64* (2006.01)
*H05B 6/66* (2006.01)
*H05B 6/68* (2006.01)
*H05B 6/78* (2006.01)

(56) References Cited

U.S. PATENT DOCUMENTS

| | | | | |
|---|---|---|---|---|
| 5,277,105 A | * | 1/1994 | Bruno | F24C 15/025 |
| | | | | 99/476 |
| 9,053,483 B2 | | 6/2015 | Geisner et al. | |
| 9,528,972 B2 | | 12/2016 | Minvielle | |
| 2005/0046584 A1 | | 3/2005 | Breed | |
| 2006/0043190 A1 | * | 3/2006 | Jeon | H05B 6/6441 |
| | | | | 235/462.13 |
| 2007/0001012 A1 | * | 1/2007 | Kim | H05B 6/6441 |
| | | | | 235/462.23 |
| 2007/0012307 A1 | * | 1/2007 | Wiker | A21B 1/40 |
| | | | | 126/21 A |
| 2009/0075224 A1 | * | 3/2009 | Wiker | A21B 1/48 |
| | | | | 432/8 |
| 2010/0134620 A1 | * | 6/2010 | Bielstein | H04N 7/188 |
| | | | | 348/143 |
| 2011/0048244 A1 | * | 3/2011 | Wiker | A21B 1/245 |
| | | | | 99/443 C |
| 2011/0269085 A1 | * | 11/2011 | Wiker | A21B 1/48 |
| | | | | 219/388 |
| 2012/0271445 A1 | * | 10/2012 | Li | G01N 21/95 |
| | | | | 700/103 |
| 2013/0306616 A1 | | 11/2013 | Wildebush | |
| 2013/0306627 A1 | | 11/2013 | Libman et al. | |
| 2015/0056344 A1 | | 2/2015 | Luckhardt | |
| 2015/0362182 A1 | * | 12/2015 | Bertram | F23G 5/10 |
| | | | | 432/24 |
| 2016/0327279 A1 | * | 11/2016 | Bhogal | A23L 5/17 |
| 2016/0327281 A1 | * | 11/2016 | Bhogal | H05B 1/0263 |
| 2017/0099987 A1 | * | 4/2017 | Patel | A47J 37/045 |
| 2018/0092486 A1 | * | 4/2018 | Kwon | H05B 6/645 |

* cited by examiner

PATTERN RECOGNIZING APPLIANCE

CROSS-REFERENCE TO RELATED PATENT APPLICATIONS

This application is a continuation of U.S. patent application Ser. No. 15/984,006, filed May 18, 2018, which claims the benefit of U.S. Provisional Patent Application No. 62/508,822, filed May 19, 2017, both of which are incorporated herein by reference in their entireties.

BACKGROUND

Food service appliances typically include a control screen that facilitates selecting a particular product to be heated, warmed, toasted, and/or cooled. The appliance may then implement a pre-programmed control strategy that adjusts a variety of settings such as speed, temperature, etc. for the selected product. Such a process can be time consuming in use and is prone to input errors by the user. This process also requires the use of expensive input panels with graphics.

SUMMARY

One embodiment relates to a food preparation appliance. The food preparation appliance includes a housing, a conveyor, a thermal element, a first sensor, a second sensor, and a third sensor. The housing defines an inlet, an outlet, and a processing zone between the inlet and the outlet. The conveyor is configured to move a food product from the inlet, through the processing zone, and to the outlet. The thermal element is positioned within the processing zone. The first sensor is positioned proximate the inlet of the housing and along a lateral side of the conveyor or along a first cantilever arm extending laterally across the conveyor. The first sensor is configured acquire pre-processing data regarding a pre-processing characteristic of the food product to be processed by the food preparation appliance. The second sensor is positioned within the processing zone. The second sensor is configured to acquire processing data regarding an in-process characteristic of the food product. The third sensor is positioned proximate the outlet of the housing and along a lateral side of the conveyor or along a second cantilever arm extending laterally across the conveyor. The third sensor is configured to acquire post-processing data regarding a post-processing characteristic of the food product.

Another embodiment relates to a food preparation appliance. The food preparation appliance includes a housing, a conveyor, a sensor, a heating element, and a controller. The housing defines an inlet, an outlet, and a processing zone between the inlet and the outlet. The heating element is positioned within the processing zone. At least one of (i) the conveyor includes a plurality of independently controllable conveyors arranged side-by-side or (ii) the heating element includes a plurality of independently controllable heating elements. The controller has programmed instructions to receive data from the sensor regarding a plurality of food products on the conveyor to facilitate tracking the plurality of food products as the plurality of food products are moved through the processing zone simultaneously by the conveyor, the data including information regarding (i) a respective type of each of the plurality of food products and (ii) a positioning of the plurality of food products relative to one another; and variably control operation of at least one of the conveyor or the heating element based on the data to facilitate variably processing the plurality of food products as the plurality of food products are moved through the processing zone simultaneously by the conveyor to achieve target processing for each of the plurality of food products.

Still another embodiment relates to a food preparation appliance. The food preparation appliance includes a housing, a conveyor, and a heating element. The housing defines an inlet, an outlet, and a processing zone between the inlet and the outlet. The conveyor is configured to move food products from the inlet, through the processing zone, and to the outlet. The heating element is positioned within the processing zone. The conveyor and the heating element are configured to facilitate providing independent zone processing such that multiple food products can be processed simultaneously with different operating parameters as the conveyor moves the multiple food products through the processing zone simultaneously.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
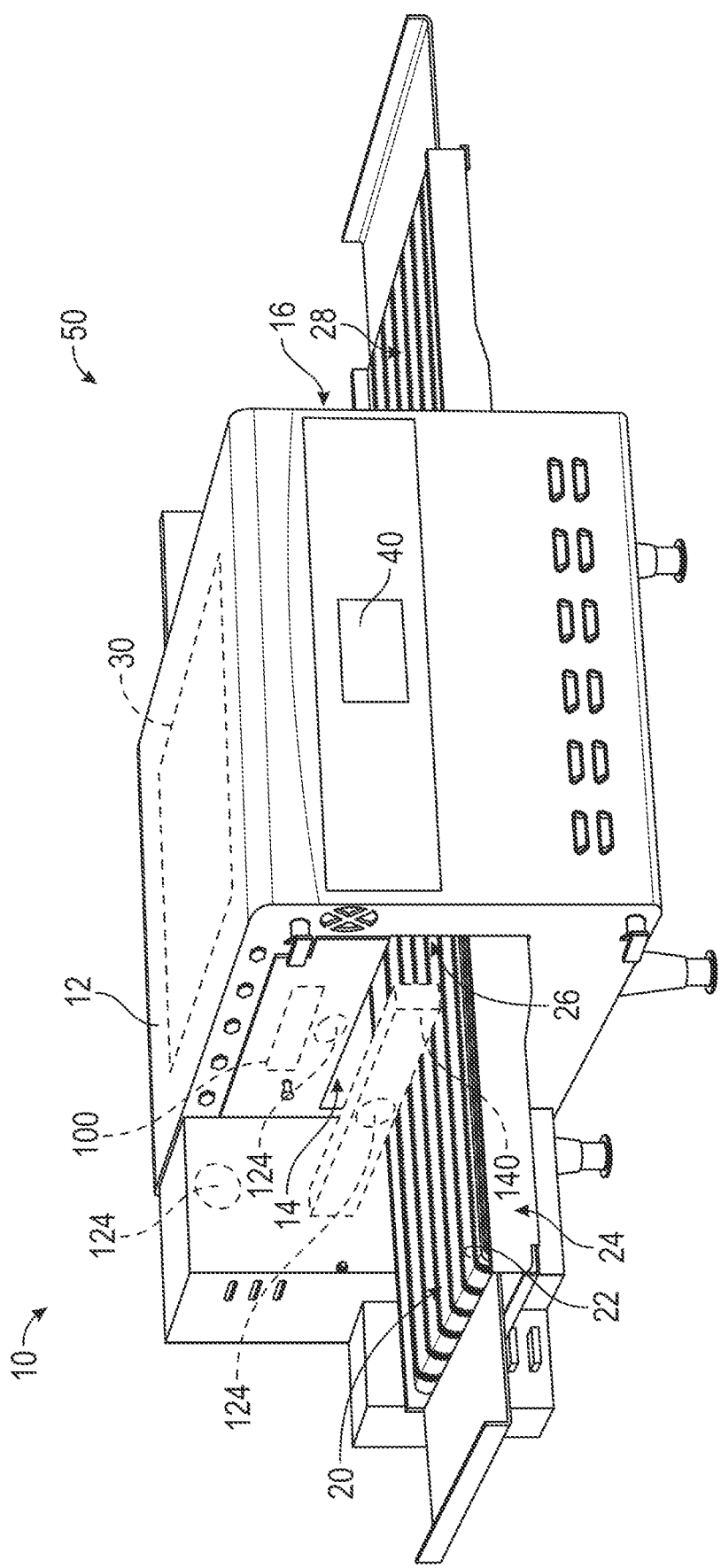
FIG. 1 is a perspective view of a food preparation appliance, according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a food preparation appliance (e.g., a toaster, a toaster oven, a microwave, a conveyor oven, etc.) includes a food recognition system (e.g., a camera, a sensor, a weight scale, a scanner device, a processing circuit, etc.) is configured to facilitate automatic input control of the food preparation appliance. The food recognition system may be configured to scan and/or utilize photographic and/or pattern recognition software to recognize (e.g., determine, identify, categorize, locate, etc.) a food product and/or a number of portions of a food product (e.g., one item, four items, etc.) entering and/or within the food preparation appliance to be heated, warmed, toasted, or cooled (e.g., based on shape, color, texture, size, weight, etc.). The food recognition system may also include a scale configured to weigh the food product put onto and/or into the food preparation appliance. The food recognition system may analyze such weight information to further determine the size, location, number of portions, and/or identity of the product to be cooled, warmed, heated, and/or cooked.

The food recognition system may further be configured to automatically set the food preparation appliance to pre-defined operating parameters based on the identity, category, type, location, shape, size, weight, etc. of the food product for target (e.g., optimum, etc.) operation of the food preparation appliance and to provide an end product having target (e.g., desired, etc.) characteristics. The operating parameters may include the speed of a processing mechanism (e.g., a conveyor, a turntable, etc.), a temperature of a thermal element (e.g., a heating element, a cooling element, etc.), a humidity level, an elapsed time (e.g., a heating time, a cooling time, etc.), and/or still other parameters. Food cooking, heating, warming, toasting, and cooling appliances in addition to a variety of food processing equipment are typically controlled manually by inputting the particular food to be cooked, heated, warmed, toasted, cooled, or frozen into an input panel. This panel may be a touchscreen or other type of input panel. According to an exemplary embodiment, the food preparation appliance of the present disclosure advantageously automates these functions providing a faster and more error proof entry system through the automatic detection/recognition of the food product being processed (e.g., heated, warmed, cooked, cooled, frozen, etc.).

According to the exemplary embodiment shown in FIGS. 1-5, a device, apparatus, or appliance, shown as food preparation appliance 10, is configured to at least one of heat, warm, toast, bake, broil, cook, cool, and freeze one or more products, shown as food products 18 (e.g., a bagel, bread, a muffin, a pastry, a sandwich, an English muffin, a hamburger patty, a hot dog or other sausage, a chicken breast, a steak, a fish filet, etc.). According to the exemplary embodiment shown in FIG. 1, the food preparation appliance 10 is configured as a line conveyor oven 50. According to the exemplary embodiment shown in FIG. 2, the food preparation appliance 10 is configured as a conveyor toaster 52. According to the exemplary embodiment shown in FIG. 3, the food preparation appliance 10 is configured as a toaster 54. According to the exemplary embodiment shown in FIG. 4, the food preparation appliance 10 is configured as a toaster oven 56. According to the exemplary embodiment shown in FIG. 5, the food preparation appliance 10 is configured as a microwave oven 58. According to another exemplary embodiment, the food preparation appliance 10 is still another type of food preparation appliance such as a conventional oven, a convection oven, an air fryer, a grill, etc.

Figure 2:
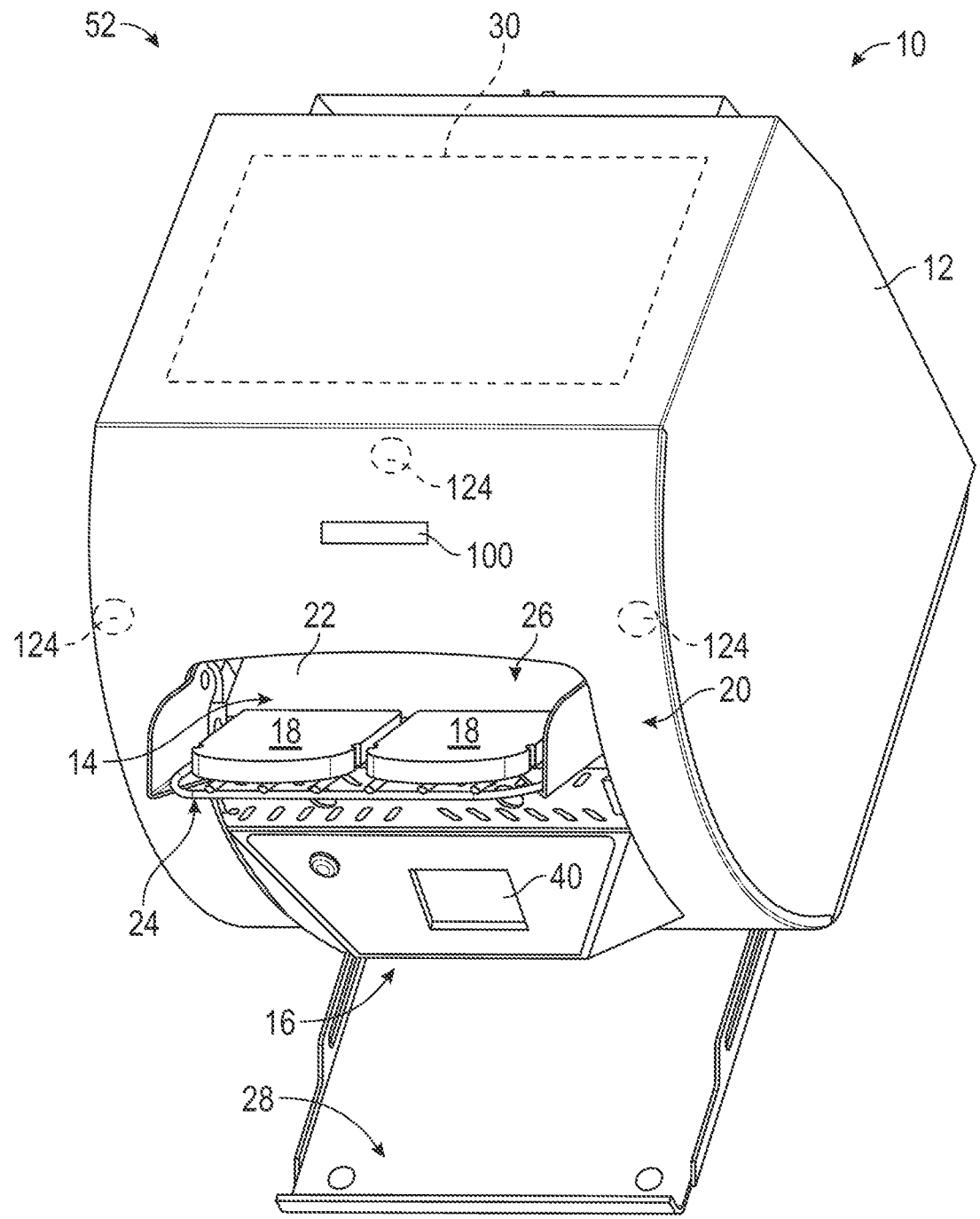
FIG. 2 is a perspective view of a food preparation appliance, according to another exemplary embodiment.
Figure 3:
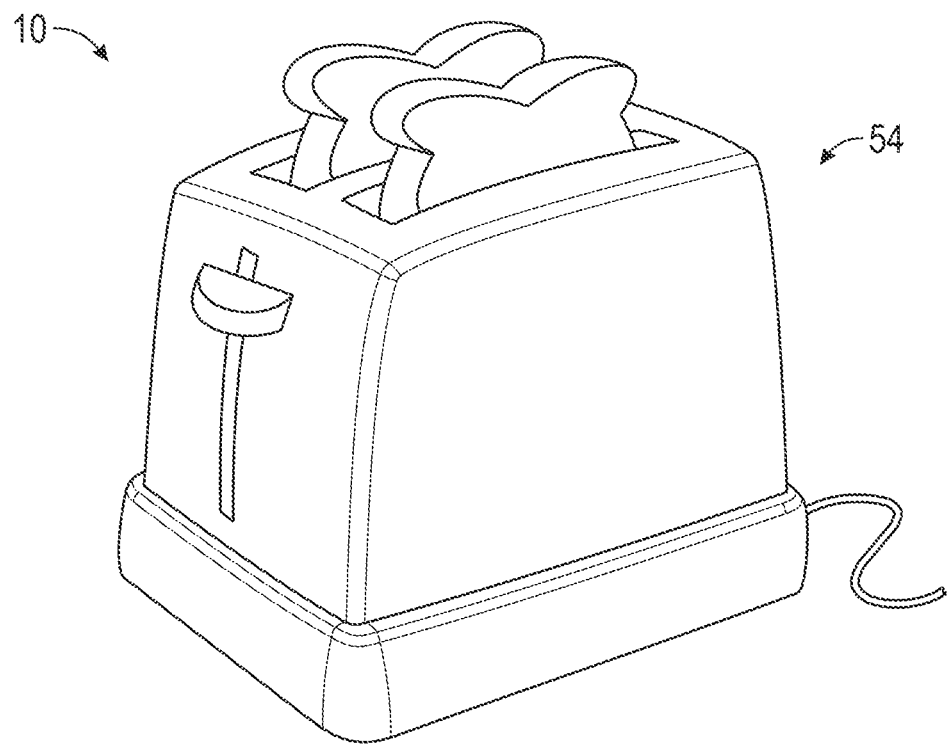
FIG. 3 is a perspective view of a food preparation appliance, according to still another exemplary embodiment.
Figure 4:
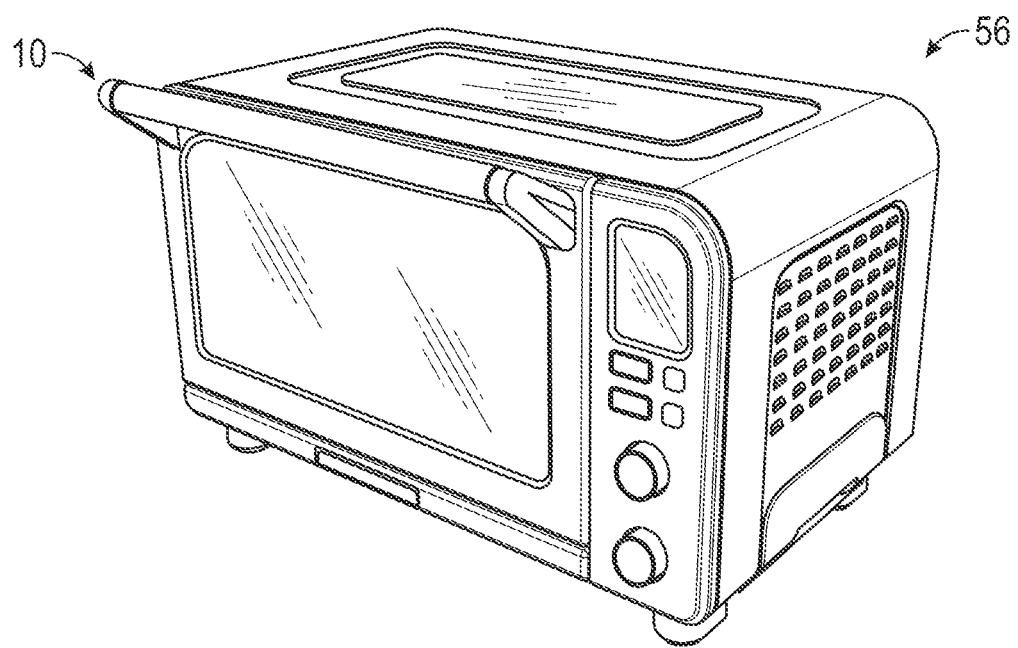
FIG. 4 is a perspective view of a food preparation appliance, according to yet another exemplary embodiment.
Figure 5:
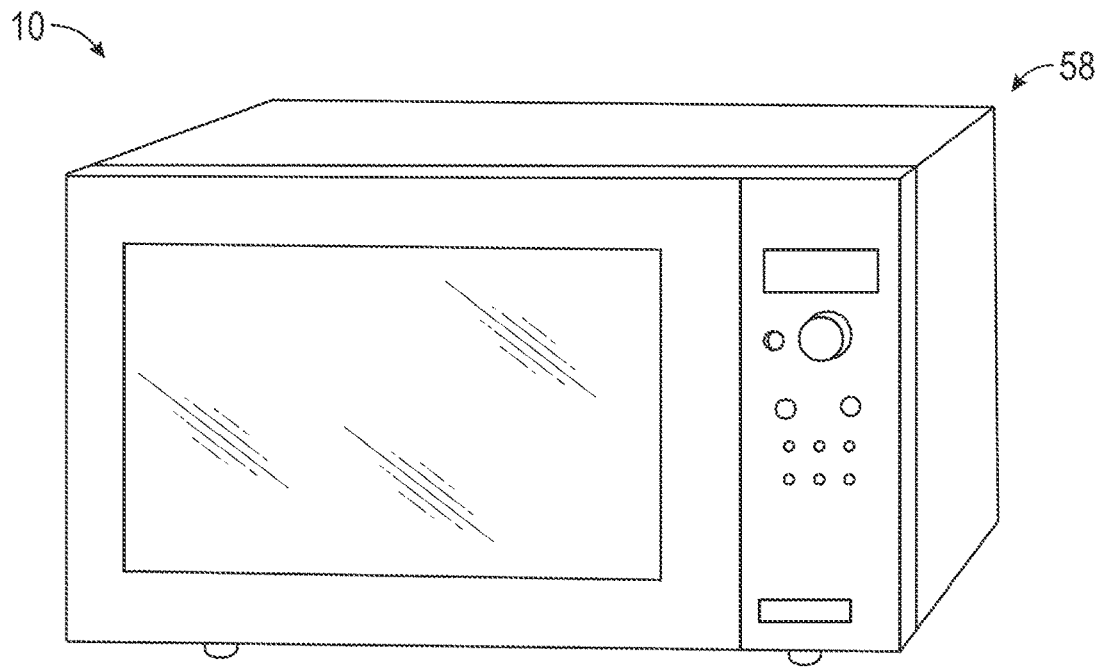
FIG. 5 is a perspective view of a food preparation appliance, according to still yet another exemplary embodiment.

As shown in FIGS. 1 and 2, the food preparation appliance 10 includes a housing, shown as oven housing 12; a processing mechanism, shown as food processing mechanism 20; a thermal element, shown as thermal element 30; an interface, shown as user interface 40; and a detection, identification, and/or recognition system, shown as food recognition system 100. The oven housing 12 defines with a first aperture, shown as inlet 14, through which the food products 18 are inserted into the food preparation appliance 10, and a second aperture, shown as outlet 16, through which the food product 18 exit the food preparation appliance 10 after being processed (e.g., warmed, heated, toasted, cooked, broiled, baked, cooled, frozen, etc.). The top, sides, and back of the oven housing 12 may be insulated.

As shown in FIGS. 1 and 2, the food processing mechanism 20 is configured as a conveyor system, shown as conveyor 22. The conveyor 22 includes a first zone (e.g., an inlet conveyor portion, an inlet chute, etc.), shown as entry zone 24; a second zone (e.g., a heating zone, a cooling zone, etc.), shown as processing zone 26; and a third zone (e.g., an exit conveyor portion, an exit chute, etc.), shown as exit zone 28. According to an exemplary embodiment, the conveyor 22 is configured to move the food products 18 (e.g., the conveyor 22 is driven by a motor, etc.) from the entry zone 24, through the processing zone 26, and out to the exit zone 28 such that the food products 18 may be processed (e.g., warmed, heated, toasted, cooked, broiled, baked, cooled, frozen, etc.) by the food preparation appliance 10 (e.g., the thermal element 30 thereof, etc.). In other embodiments, the food processing mechanism 20 is configured as a different type of processing mechanism. By way of example, the microwave oven 58 may include a turntable processing mechanism that rotates a food product 18 within the microwave oven 58. By way of another example, the toaster 54 may include a manually and/or automatically translatable processing mechanism or cage that actuates up and down to lower and eject a food product 18 into and out of the toaster 54.

As shown in FIGS. 1 and 2, the thermal element 30 is positioned within the oven housing 12 proximate (e.g., above, on the sides, below, etc.) the processing zone 26 of the food processing mechanism 20. According to an exemplary embodiment, the thermal element 30 is configured to warm, heat, toast, cook, broil, bake, cool, and/or freeze the food products 18 within the processing zone 26. According to the exemplary embodiments shown in FIGS. 1-5, the thermal element 30 includes a heating element (e.g., an induction coil, a radiative heating coil, a fan/blower element, a Peltier device, etc.) configured to thermally regulate the processing zone 26 such that a food product 18 within and/or moving through the processing zone 26 is processed (e.g., warmed, heated, toasted, cooked, broiled, baked, etc.) to desired conditions (e.g., lightly toasted, medium toasted, medium rare, medium well, etc.). In one embodiment, the heating element is configured to provide a radiative heating operation. In another embodiment, the heating element is configured to provide a convective heating operation. In still another embodiment, the heating element is configured to provide a conductive heating operation. In some embodiments, the heating element is configured to provide at least one of a radiative heating operation, a convective heating operation, and a conductive heating operation. In some embodiments, the thermal element 30 additionally or alternatively includes a cooling element (e.g., a thermoelectric cooler, a Peltier device, cooling coils, a refrigeration system, etc.) configured to thermally regulate the processing zone 26 such that a food product 18 within and/or moving through the processing zone 26 is processed (e.g., cooled, etc.) to desired conditions (e.g., chilled, frozen, etc.).

According to an exemplary embodiment, the user interface 40 facilitates communication between an operator (e.g., cook, chef, staff member, etc.) of the food preparation appliance 10 and one or more components (e.g., the food processing mechanism 20, the thermal element 30, the food recognition system 100, etc.) of the food preparation appliance 10. By way of example, the user interface 40 may include at least one of an interactive display, a touchscreen device, one or more buttons (e.g., a stop button configured to turn the unit off, buttons allowing a user to set a target temperature, buttons to turn a lighting element on and off, etc.), and switches. In one embodiment, the user interface 40 includes a notification device (e.g., alarm, light, display, etc.) that notifies the operator when the food preparation appliance 10 is on, off, in a standby mode, in a heating mode, and/or in a cooling mode. An operator may use the user interface 40 to manually set operating parameters of the food preparation appliance 10 and/or set predefined parameters for the food preparation appliance 10 (e.g., that may be automatically implemented by the food preparation appliance 10 based on determinations made by the food recognition system 100, etc.). In some embodiments, the user interface 40 is provided by a portable device (e.g., a smartphone, a tablet, a smartwatch, a laptop, etc.) wirelessly coupled (e.g., via Wi-Fi, Bluetooth, etc.) to the food preparation appliance 10.

As shown in FIGS. 1 and 2, the food recognition system 100 is positioned on the outside of the oven housing 12 of the food preparation appliance 10, proximate the inlet 14 of the oven housing 12. In some embodiments, at least a portion of the food recognition system 100 is additionally or alternatively positioned within the oven housing 12 proximate the processing zone 26 of the food processing mechanism 20. In some embodiments, at least a portion of the food recognition system 100 is additionally or alternatively positioned on the outside of the oven housing 12 of the food preparation appliance 10, proximate the outlet 16 of the oven housing 12. In some embodiments, at least a portion of the food recognition system 100 is additionally or alternatively positioned proximate the entry zone 24 of the food processing mechanism 20. In some embodiments, at least a portion of the food recognition system 100 is additionally or alternatively positioned proximate the exit zone 28 of the food processing mechanism 20.

Figure 6:
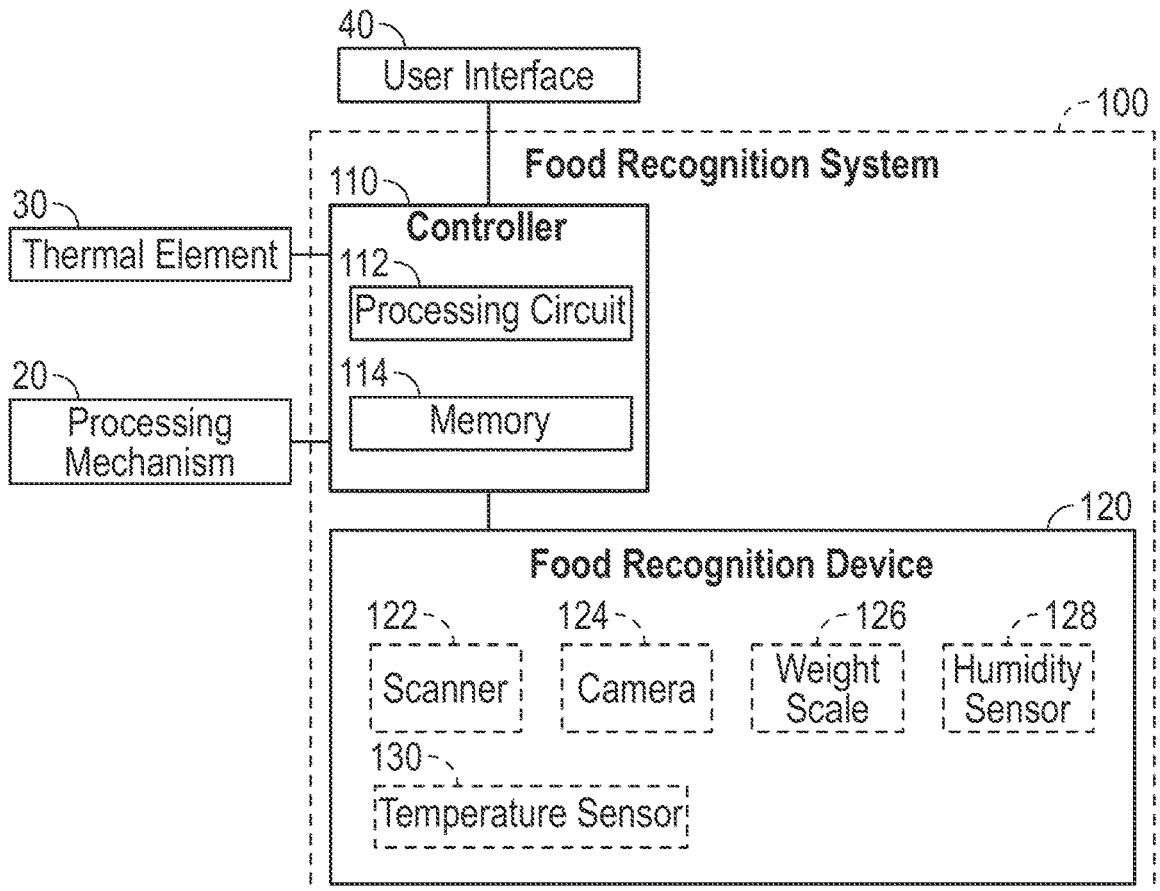
FIG. 6 is a schematic diagram of a food recognition system of a food preparation appliance, according to an exemplary embodiment.

As shown in FIG. 6, the food recognition system 100 includes a controller system, shown as controller 110, and a sensor system, shown as food recognition device 120. In one embodiment, the controller 110 is configured to selectively engage, selectively disengage, control, and/or otherwise communicate with components of the food preparation appliance 10 and/or the food recognition device 120. As shown in FIG. 6, the controller 110 is coupled to the food processing mechanism 20 (e.g., a motor that drives a conveyor or turntable, etc.), the thermal element 30 (e.g., a heating element, a cooling element, etc.), the user interface 40, and the food recognition device 120. In other embodiments, the controller 110 is coupled to more or fewer components. By way of example, the controller 110 may send and receive signals with the food processing mechanism 20, the thermal element 30, the user interface 40, and/or the food recognition device 120.

The controller 110 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to the exemplary embodiment shown in FIG. 6, the controller 110 includes a processing circuit 112 and a memory 114. The processing circuit 112 may include an ASIC, one or more FPGAs, a DSP, circuits containing one or more processing components, circuitry for supporting a microprocessor, a group of processing components, a graphics card, or any other suitable electronic processing components. In some embodiments, the processing circuit 112 is configured to execute computer code stored in the memory 114 to facilitate the activities described herein. The memory 114 may be any volatile or non-volatile computer-readable storage medium capable of storing data or computer code relating to the activities described herein. According to an exemplary embodiment, the memory 114 includes computer code modules (e.g., executable code, object code, source code, script code, machine code, etc.) configured for execution by the processing circuit 112. By way of example, the computer code may be a learning algorithm that includes a deep learning algorithm or a neural network algorithm. The learning algorithm may learn from previous operating cycles and improve over time (e.g., become more accurate and precise over continued use and additional operating cycles, etc.).

According to an exemplary embodiment, the food recognition device 120 is configured to acquire data regarding one or more food products 18 (i) entering the food preparation appliance 10 (e.g., to be processed within the processing zone 26 by the thermal element 30, pre-processing, etc.), (ii) within the processing zone 26 of the food preparation appliance 10 (e.g., being processed, etc.), and/or (iii) exiting the food preparation appliance 10 (e.g., post-processing, etc.). By way of example, the data regarding the one or more food products 18 entering and/or within the processing zone 26 may include identifying characteristics (e.g., identifying data, etc.) such as a size (e.g., width, length, thickness, etc.), a shape (e.g., round, square, bagel shaped, bread shaped, muffin shaped, etc.), a color (e.g., a solid color, multicolor, a light color, a dark color, spotted, etc.), a texture (e.g., plain, smooth, rough, bumpy, etc.), a weight, a number of portions (e.g., one item, four items, half an item, etc.), nutrition content (e.g., fat content, etc.), and/or still other identifying characteristics of the food product(s) 18. By way of another example, the data regarding the one or more food products 18 within and/or exiting the processing zone 26 may include processing characteristics (e.g., processing data, etc.) including a change in color (e.g., darkening from a heating process, etc.), a change in size (e.g., a reduction in size in response to cooking, etc.), a change in texture (e.g., melted, crispy, etc. in response to a heating process), a change in temperature (e.g., a decrease in temperature, an increase in temperature, etc.), and/or a change in weight of the food products 18 in response to the processing (e.g., heating, warming, cooking, toasting, broiling, baking, cooling, freezing, etc.) performed by the food preparation appliance 10.

In another embodiment, the controller 110 is configured to evaluate data relating to the one or more food products 18 (e.g., before they enter the food preparation appliance 10, as they enter the food preparation appliance 10, etc.), determine one or more potential features (e.g., identities, etc.) of the one or more food products 18, and interface with the user interface 40 to display information (e.g., graphical representations, text, etc.) relating to the one or more potential features. The user interface 40 may further facilitate a user verification of the one or more food products 18 and/or an interface by which the user may initiate operation of the food preparation appliance 10 (e.g., a start icon or button, etc.). The operation of the food preparation appliance 10 may be tailored to the specific one or more food products 18. By way of example, the user may provide a blueberry bagel for processing. The controller 110 may evaluate data collected by the food recognition device 120 and determine that the one or more food products 18 could be a blueberry bagel or a chocolate chip bagel. The controller 110 may interface with user interface 40 to present images of a blueberry bagel and a chocolate chip bagel. The user may select the blueberry bagel and press a start icon to initiate processing. The system may have a pre-selected option (e.g., the blueberry bagel, etc.) that corresponds with the potential feature the controller 110 determines is more likely associated with the one or more food products 18. The system may proceed with processing if the user has not made a verification within a preset period of time (e.g., potentially indicating that the user has walked away from the food preparation appliance 10, etc.). The selection by the user may be used by the controller 110 as part of a self-learning algorithm and thereby improve future operation of the food preparation appliance 10 (e.g., assessment of the one or more potential features of the one or more food products 18, etc.).

The food recognition device 120 may include one or more sensors configured to acquire the data (e.g., the identifying characteristics, the processing characteristics, etc.) regarding the one or more food products 18 entering, within, and/or exiting the processing zone 26 of the food preparation appliance 10. As shown in FIG. 6, the one or more sensors include a first sensor, shown as scanner 122; a second sensor, shown as camera 124; a third sensor, shown as weight scale 126; a fourth sensor, shown as humidity sensor 128; and a fifth sensor, shown as temperature sensor 130. In some embodiments, the food recognition device 120 additionally or alternatively includes other types of sensors configured to acquire the data regarding the one or more food products 18 entering, exiting, and/or within the processing zone 26 of the food preparation appliance 10. In some embodiments, the food recognition device 120 does not include one or more of the scanner 122, the camera 124, the weight scale 126, the humidity sensor 128, and/or temperature sensor 130. In some embodiments, the food preparation appliance 10 includes a plurality of scanners 122, a plurality of cameras 124, a plurality of weight scales 126, a plurality of humidity sensors 128, and/or a plurality of temperature sensors 130 variously positioned about the food preparation appliance 10. By way of example, one or more of the plurality of scanners 122, the plurality of cameras 124, the plurality of weight scales 126, the plurality of humidity sensors 128, and/or the plurality of temperature sensors 130 may be positioned above, below, to the sides, and/or at an angle relative to the food products 18 that are moved through or within the food preparation appliance 10.

The scanner 122 may be configured to acquire data regarding the size, the change in size, the shape, the change in shape, the color, the change in color, the texture, the change in texture, and/or number of portions of the food products 18 entering, within, and/or exiting the processing zone 26 of the food preparation appliance 10. The food preparation appliance 10 may include one or more scanners 122 positioned at the entry zone 24, the inlet 14, the processing zone 26, the outlet 16, and/or the exit zone 28.

The camera 124 may be configured to acquire data regarding the size, the change in size, the shape, the change in shape, the color, the change in color, the texture, the change in texture, and/or number of portions of the food products 18 entering, within, and/or exiting the processing zone 26 of the food preparation appliance 10. In one embodiment, the camera 124 is a still photography camera configured to acquire still photographs or images. In some embodiments, the camera 124 is configured to take one image or multiple images of the same food product 18 for processing by the controller 110. In another embodiment, the camera 124 is a video camera configured to acquire video. In some embodiments, the camera 124 has an infrared imaging capability that facilitates identifying the heat radiated by the food products 18. Such an infrared imaging capability may facilitate monitoring a change in temperature of the food products 18 over time (e.g., for determining doneness, etc.).

As shown in FIGS. 1 and 2, the camera 124 is positionable is various locations about the food preparation appliance 10 proximate the entry zone 24 and the inlet 14 (e.g., positioned directly above the inlet 14, positioned laterally at a side of the entry zone 24. As shown in FIG. 1, in some embodiments, the food preparation appliance 10 includes an arm, shown as cantilever arm 140, that extends laterally across the entry zone 24 of the conveyor 22. One or more of the cameras 124 may be positioned on the cantilever arm 140. In some embodiments, the scanner 122 and/or the temperature sensor 130 are additionally or alternatively positioned on the cantilever arm 140. In some embodiments, the food preparation appliance 10 additionally or alternatively includes a second cantilever arm 140 that extends laterally across the exit zone 28 of the conveyor 22. In some embodiments, the camera 124 is otherwise positioned (e.g., above, below, to the sides, at an angular position, etc. relative to food products moving through the food preparation appliance 10). In some embodiments, the food preparation appliance 10 includes a plurality of the cameras 124 variously positioned about the food preparation appliance 10. In some embodiments, the food preparation appliance 10 includes an array of cameras 124 that extend across the entry zone 24, the inlet 14, the processing zone 26, the outlet 16, and/or the exit zone 28.

The weight scale 126 may be configured to acquire data (e.g., weight data, etc.) regarding the weight and/or the change in weight of the food products 18 entering, within, and/or exiting the processing zone 26 of the food preparation appliance 10. The food preparation appliance 10 may include one or more weight scales 126 positioned at the entry zone 24, the inlet 14, the processing zone 26, the outlet 16, and/or the exit zone 28 (e.g., underneath the food processing mechanism 20, etc.). In some embodiments, the weight scale 126 is configured to self-calibrate prior to a new load being placed on or traveling across the weight scale 126 (e.g., each time a food product 18 finishes passing over the weight scale 126, etc.). The humidity sensor 128 may be configured to acquire data (e.g., humidity data, etc.) regarding a humidity level within the processing zone 26. The humidity sensor 128 may be positioned in the processing zone 26 within the oven housing 12. In some embodiments, the food preparation appliance 10 include a humidifier configured to facilitate selectively modulating (e.g., with the controller 110, etc.) the humidity level within the processing zone 26. The temperature sensor 130 may be configured to acquire data (e.g., temperature data, etc.) regarding a temperature within the processing zone 26, of the thermal element 30, and/or of the food products 18 (e.g., a pre-processing temperature, a change in temperature during processing, a post-processing temperature, etc.).

According to an exemplary embodiment, the controller 110 is configured to receive the data (e.g., the identifying data, the processing data, the weight data, the humidity data, the temperature data, etc.) regarding the one or more food products 18 entering, within, and/or exiting the food preparation appliance 10. The controller 110 is then configured to analyze the data and set control parameters of the food preparation appliance 10 to automatically process the food products 18 based on the data.

By way of example, the controller 110 may be configured to determine (e.g., identify, locate, recognize, categorize, classify, etc.) a type, a class, and/or a category of a food product 18 based on the identifying characteristics included in the data. For example, the controller 110 may be configured to determine the type, the class, and/or the category of a food product 18 based on the shape, the size, the color, the texture, nutrition content, and/or the weight of the food product 18. As an example, the controller 110 may be configured to compare the identifying characteristics to a database of predefined identifying characteristics of various food products (e.g., stored in the memory 114, etc.). The controller 110 may then identify the type, class, and/or category of the food product after such comparison. By way of example, the types, classes, and/or categories may include bread, bagels, muffins, pastries, meat, etc.

In some embodiments, the controller 110 is configured to determine (e.g., identify, recognize, sub-categorize, sub-classify, etc.) a sub-type, a sub-class, and/or a sub-category of the food product 18 based on the identifying characteristics. By way of example, the controller 110 may be configured to determine the specific type of bagel (e.g., plain, cinnamon raisin, everything, onion, asiago cheese, etc.). By way of another example, the controller 110 may be configured to determine the specific type of bread (e.g., a slice of bread, a loaf of bread, a baguette, an English muffin, a roll, etc.; sourdough, rye, white, Italian, French, pumpernickel bread, etc.; etc.). By way of another example, the controller 110 may be configured to determine the specific type of muffin (e.g., chocolate chip, banana nut, blueberry, etc.). By way of another example, the controller 110 may be configured to determine the specific type of meat (e.g., chicken, beef, pork, lamb, venison, fish, etc.), a cut of meat (e.g., filet, back strap, tenderloin, leg, thigh, breast, ribs, etc.), a fat content of the meat, and/or other defining characteristics of meat (e.g., in a patty shape, a sausage link, etc.) such that the meat can be heated and cooked properly to the appropriate doneness for consumption.

In some embodiments, the controller 110 is configured to provide a message on the user interface 40 if the controller 110 is unable to identify what a respective food product 18 is with sufficient accuracy (e.g., the confidence level for the respective food product is below a predefined threshold, etc.). By way of example, the controller 110 may narrow down a food product 18 to be either a blueberry bagel or a chocolate chip bagel. The controller 110 may then provide an operator with the option to choose between the two or to indicate the food product 18 is different than the options provided via the user interface 40. In some embodiments, the controller 10 is configured to request confirmation of the identified food product 18 and/or a desired doneness for the identified food product 18 via the user interface 40 prior to starting. The operator may simply select "start" if the food product 18 has been properly identified and/or may enter a desired doneness for the food product 18 (e.g., rare, medium rare, medium, medium well, etc.; a level of toastedness; etc.).

According to an exemplary embodiment, the controller 110 is configured to automatically set operating parameters of the food preparation appliance 10 based on at least one of (i) the type, class, and/or category of the food product 18, (ii) the sub-type, sub-class, and/or sub-category of the food product 18, and (iii) the doneness information provided by the operator (e.g., based on predefined operating parameters stored in the memory 114 for the type and/or sub-type, etc.). By way of example, the operating parameters may include the speed of the food processing mechanism 20 (e.g., the conveyor 22, a turntable, etc.), a temperature of the thermal element 30 (e.g., a heating element, a cooling element, etc.), a humidity level within the processing zone 26 (e.g., provided by the humidifier, etc.), an elapsed processing time (e.g., a heating time, a cooling time, etc.), and/or still other parameters.

In some embodiments, the controller 110 is configured to adjust the operating parameters based on the size, weight, number of portions, and/or temperature of the food product 18 entering the processing zone 26. By way of example, if the food product 18 is relatively thin, small, and/or light, different operating parameters may be used relative to if the food product 18 were relatively thicker, larger, and/or heavier (e.g., a faster speed and/or a lower temperature for thinner food products, a slower speed and/or a higher temperature for thicker food products, etc.). By way of another example, different operating parameters may be used for a lesser quantity of food products relative to a greater quantity of food products. For example, the speed may be reduced and/or the time increased when a relatively greater quantity of food products are introduced simultaneously. By way of another example, different operating parameters may be used for food products having varying initial temperatures. For example, the time, speed, and/or temperature of the food preparation appliance 10 may be different for a frozen food product versus a room temperature food product.

In some embodiments, the controller 110 is configured to estimate the weight of a food product 18 based on the identifying characteristics (e.g., in embodiments that do not include the weight scale 126, etc.). For example, the controller 110 may be configured to estimate the weight of the food product 18 based on the category, subcategory, and/or size of the food product 18.

In some embodiments, the controller 110 is configured to alter or modify the current operating parameters of the food preparation appliance 10 and/or the predefined operating parameters (e.g., stored in the memory 114, etc.) based on the processing characteristics (e.g., a change in color, a change in size, a change in texture, a change in temperature, a change in weight, etc.) of the food product 18 being processed or that has finished being processed. By way of example, the controller 110 may recognize that a food product 18 is processing too quickly (e.g., potential of being overcooked, burned, too hot etc.) or too slowly (e.g., potential of being undercooked, too cold, etc.). In some embodiments, the controller 110 is configured to alter or modify the current operating parameters to either slow or quicken the processing of the food product based on the processing characteristics. In some embodiments, the controller 110 is configured to alter or modify the predefined operating parameters such that food products 18 of the same type, category, class, sub-type, sub-category, and/or sub-class are more desirably processed (e.g., an optimal amount of cooking, etc.) by the food preparation appliance 10 in the future.

In some embodiments, the controller 110 is configured to detect when a sensor of the food recognition device 120 (e.g., the scanner 122, the camera 124, etc.) is dirty or otherwise obscured (e.g., a lens thereof is dirty, etc.). The controller 110 may be configured to thereafter provide an indication of such on the user interface 40 to notify an operator that cleaning of the food recognition device 120 may be needed.

Figure 7:
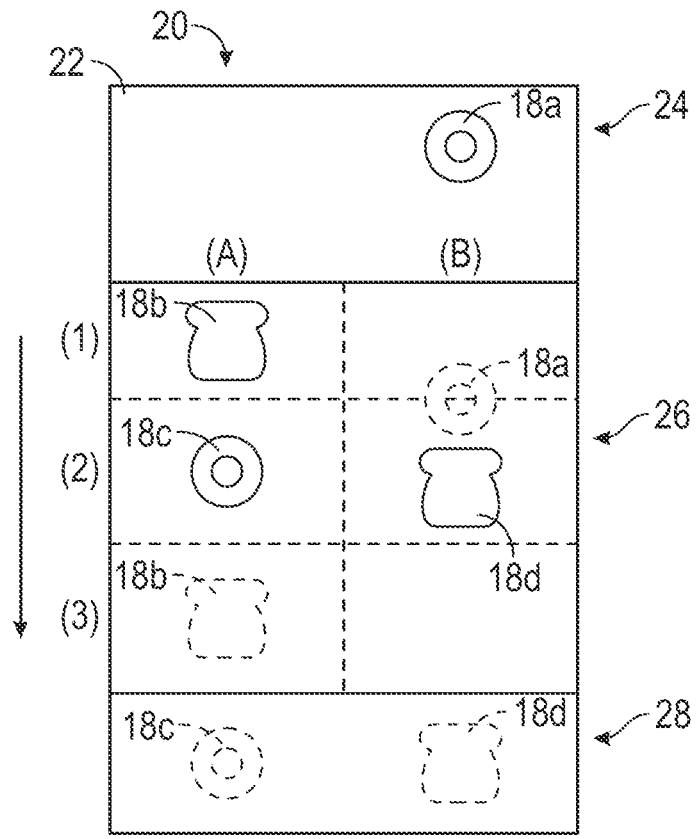
FIG. 7 is a schematic diagram of a food preparation process performed by a processing mechanism of a food preparation appliance, according to an exemplary embodiment.

In some embodiments, the controller 110 is configured to generate a graphical representation of the food products 18 and the position of the food products 18 along the food processing mechanism 20. Such a graphical representation may facilitate the controller 110 in tracking the food products 18 as they are received by the food preparation appliance 10 and during processing. As shown in FIG. 7, the controller 110 is configured to track a plurality of different food products 18 as they move through the food preparation appliance 10 by the food processing mechanism 20. Such tracking may facilitate providing zone heating or cooling throughout the processing zone 26 such that multiple different types of food products 18 may be processed simultaneously.

As shown in FIG. 7, the food processing mechanism 20 has received a first food product 18a (e.g., a plain bagel, etc.), a second food product 18b (e.g., a slice of white bread, etc.), a third food product 18c (e.g., an onion bagel, etc.), and a fourth food product 18d (e.g., a slice of Italian bread, etc.). The processing zone 26 is split into various zones defined by column A, column B, row 1, row 2, and row 3 (e.g., zone 1A, zone 2A, zone 3A, zone 1B, zone 2B, zone 3B, etc.). In other embodiments, the processing zone 26 has more or fewer zones (e.g., one column, three columns, one row, two rows, four rows, etc.).

According to an exemplary embodiment, the speed of the food processing mechanism 20 in each column may be individually controlled (e.g., the processing mechanism includes two or more independent conveyors 22, etc.) and/or the temperature of each zone may be individually controlled (e.g., the thermal element includes two or more independent thermal elements 30, etc.). The controller 110 may therefore be configured to selectively adjust the speed of each column of the food processing mechanism 20 (e.g., column A of the conveyor 22, column B of the conveyor 22, etc.) and/or the temperature of each zone (e.g., zone 1A, zone 2A, zone 3A, zone 1B, zone 2B, zone 3B, etc.). As such, the controller 110 may variably adjust operating parameters based on the positions of various food products relative to each other such that each food product is processed as needed. As an example, zone 1A with the second food product 18b may be operating at a different temperature than zone 2A with the third food product 18c. As another example, column A with the second food product 18b and the third food product 18c may be moving at a different speed than column B with the fourth food product 18d. The controller 110 may be further configured to adaptively adjust the operating parameters (e.g., speed, temperature, etc.) of each of the zones as the food products 18 in each zone change over time (e.g., move through the food preparation appliance 10, as new food products 18 are introduced, etc.).

According to one exemplary embodiment, the controller 110 of the food preparation appliance 10 is configured to implement a recurrent neural network ("RNN") (e.g., through TensorFlow, etc.). The RNN runs a model that may be capable of differentiating up to 1,000 or more different categories of objects, and therefore distinguish objects from each other. The RNN model may thereby be trained to identify the various food products 18 that the food preparation appliance 10 may encounter by providing various images of the possible food products 18 to the RNN. By way of example, the RNN may be provided a sufficient quantity of images of various food products 18 (e.g., training data, etc.) that is separated within appropriately labeled folders within the RNN (e.g., category folders, sub-category folders, etc.), and then provided a sufficient number of unclassified images to learn (e.g., validation data, etc.) until a desired accuracy is achieved. Once the desired accuracy is achieved, the RNN may be uploaded to the controller 110 of various food preparation appliances 10.

To achieve the desired accuracy, the RNN separates the provided images into two categories—training data and validation data. If only the training data were used, the RNN would not learn, but simply memorize images. The RNN is configured to take the images of the training data and apply various convolution filters to them. The convolution filters may stretch, crop, multiply, make subtractions, etc. to the images of the training data, which may then be stored in a primary data type of the RNN. The primary data may be used by the RNN to identify patterns to classify objects inside of an image during operation. The RNN is then configured to take the images of the validation data and apply the various convolution filters to them and then guess the food product 18 that is within the image. Throughout this process, the RNN learns with convolutions and transformations are the most effective for each object type, and then stores this data as floating point "weights." This data is then compiled into a graph file. If the data size of the graph file is sufficiently large, the weights may be rounded to provide a significant decrease in file size while minimally affecting performance.

By way of example, the RNN training model may be deployed on a Raspberry Pi3 board equipped with a camera. The camera may be used to capture images to which the Raspberry Pi3 board will make "guesses" regarding what object is in the image based on the training data. When a positive recognition of an object is returned, a larger quantity of images will be taken immediately (e.g., a dozen or more, etc.), which may then be classified and an average confidence percentage determined. This information can then be communicated to the controller 110 for implementation during operation of the food preparation unit 10. In some embodiments, with sufficient training and quality images, the food recognition capability for numerous different food categories may exceed 94% accuracy.

Figure 8:
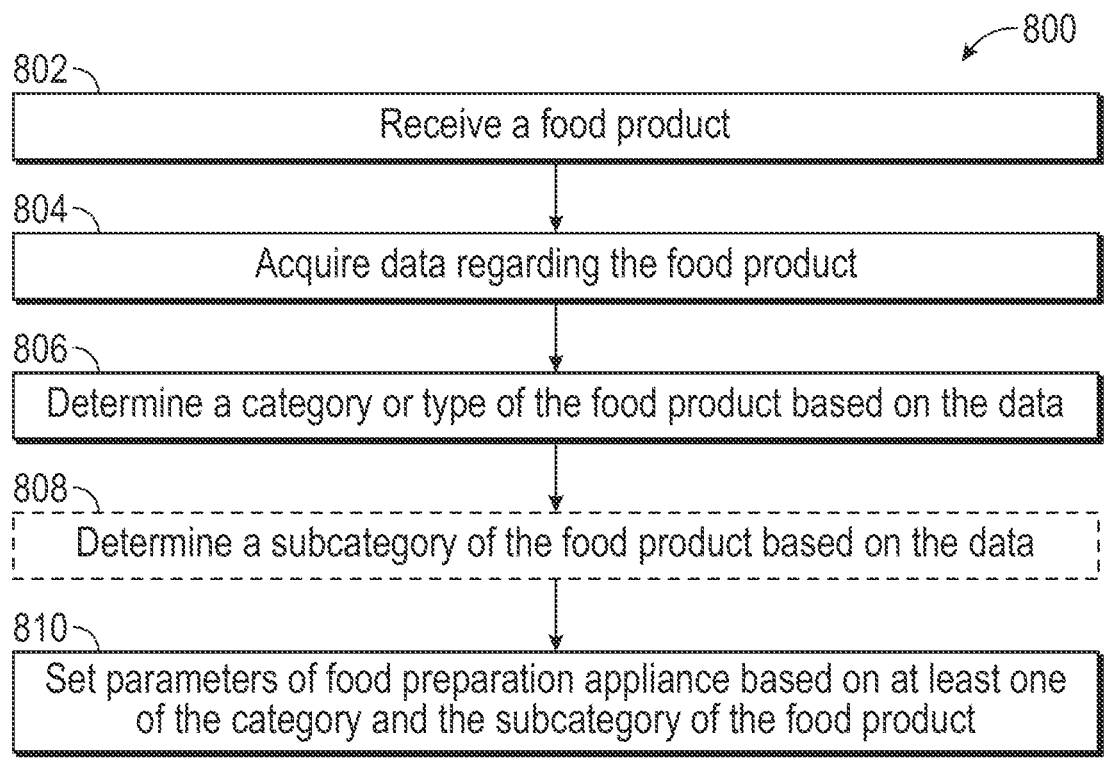
FIG. 8 is a flow diagram of a method for automatically setting operating parameters of a food preparation appliance, according to an exemplary embodiment.

Referring now to FIG. 8, a method 800 for automatically setting operating parameters of a food preparation appliance is shown, according to an exemplary embodiment. At step 802, a food preparation appliance (e.g., the food preparation appliance 10, the line conveyor oven 50, the conveyor toaster 52, the toaster 54, the toaster oven 56, the microwave oven 58, etc.) receives a food product (e.g., the food product 18, etc.) for processing (e.g., warming, heating, cooking, toasting, broiling, baking, cooling, freezing, etc.). As step 804, a sensor system (e.g., the food recognition device 120, etc.) is configured to acquire data (e.g., identifying data, etc.) regarding identifying characteristics of the food product.

At step 806, a controller (e.g., the controller 110, etc.) is configured to determine a category, type, and/or class of the food product based on the data. By way of example, the controller may be configured to compare the data to predefined characteristics for food products to determine the category, type, and/or class of the food product. Step 808 may be optional. At step 808, the controller is configured to determine a sub-category, a sub-type, and/or a sub-class of the food product based on the data. At step 810, the controller is configured to set operating parameters of the food preparation appliance at which the food product will be processed at based on at least one of (i) the category, type, and/or class of the food product and (ii) the sub-category, sub-type, and/or sub-class of the food product. In some embodiments, the operating parameters are additionally set based on an indication of a desired doneness for the food product.

In some embodiments, the controller is configured to receive second data (e.g., processing data, etc.) regarding processing characteristics of the food product. The controller may be configured to alter or modify the current operating parameters of the food preparation appliance and/or the predefined operating parameters of the food preparation appliance for future uses based on the processing characteristics.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

The invention claimed is:

1. A food preparation appliance comprising:
a housing defining an inlet, an outlet, and a processing zone between the inlet and the outlet;
a conveyor configured to move a food product from the inlet, through the processing zone, and to the outlet;
a thermal element positioned within the processing zone;
a first sensor positioned along an exterior surface of the housing proximate the inlet of the housing, the first sensor configured to acquire pre-processing data regarding a pre-processing characteristic of the food product to be processed by the food preparation appliance;
a second sensor positioned within the processing zone, the second sensor configured to acquire processing data regarding an in-process characteristic of the food product;
a third sensor positioned along the exterior surface of the housing proximate the outlet of the housing, the third sensor configured to acquire post-processing data regarding a post-processing characteristic of the food product;
a fourth sensor positioned along a lateral side of the conveyor proximate the inlet; and
a fifth sensor positioned along the lateral side of the conveyor proximate the outlet.

2. The food preparation appliance of claim 1, wherein the first the inlet and the outlet are positioned at opposing ends of the housing such that the first sensor and the third second are positioned at opposing ends of the housing.

3. A food preparation appliance comprising:
a housing defining an inlet, an outlet, and a processing zone between the inlet and the outlet;
a conveyor configured to move a food product from the inlet, through the processing zone, and to the outlet;
a thermal element positioned within the processing zone;
a first sensor positioned along an exterior surface of the housing proximate the inlet of the housing, the first sensor configured acquire pre-processing data regarding a pre-processing characteristic of the food product to be processed by the food preparation appliance;
a second sensor positioned within the processing zone, the second sensor configured to acquire processing data regarding an in-process characteristic of the food product;
a third sensor positioned along the exterior surface of the housing proximate the outlet of the housing, the third sensor configured to acquire post-processing data regarding a post-processing characteristic of the food product;
a cantilever arm extending laterally across the conveyor in front of the inlet; and
a fourth sensor positioned along the cantilever arm.

4. The food preparation appliance of claim 1, further comprising a controller having programmed instructions to:

receive the pre-processing data from the first sensor;
identify a type of the food product based on the pre-processing data;
automatically set an operating parameter of at least one of the conveyor or the thermal element for target processing of the food product based on the type;
receive the processing data from the second sensor regarding the in-process characteristic of the food product;
adaptively adjust the operating parameter during processing of the food product in response to the in-process characteristic indicating that the food product is being processed too slowly or too quickly;
receive the post-processing data from the third sensor regarding the post-processing characteristic of the food product; and
adjust the operating parameter based on the post-processing characteristic of the food product for future processing of a similar food product.

5. The food preparation appliance of claim 4, wherein the target processing includes at least one of a target amount of cooking, heating, warming, toasting, cooling, or freezing of the food product.

6. The food preparation appliance of claim 4, wherein the operating parameter includes at least one of a processing time, a temperature of the thermal element, or a speed of the conveyor.

7. The food preparation appliance of claim 4, wherein the pre-processing characteristic includes at least one of a size, a weight, a temperature, a shape, a color, a texture, a nutrition content, or a number of portions of the food product entering the food preparation appliance.

8. The food preparation appliance of claim 4, wherein at least one of the in-process characteristic or the post-processing characteristic includes at least one of a change in size, a change in weight, a change in temperature, a change in shape, a change in color, or a change in texture of the food product.

9. The food preparation appliance of claim 1, wherein the food preparation appliance is configured to provide independent zone processing such that multiple food products can be processed simultaneously with different operating parameters as the conveyor moves the multiple food products through the processing zone simultaneously.

10. A food preparation appliance comprising:
a housing defining an inlet, an outlet, and a processing zone between the inlet and the outlet;
a conveyor;
a sensor;
a heating element positioned within the processing zone, wherein at least one of (i) the conveyor includes a plurality of independently controllable conveyors arranged side-by-side or (ii) the heating element includes a plurality of independently controllable heating elements; and
a controller having programmed instructions to:
receive data from the sensor regarding a plurality of food products on the conveyor to facilitate tracking the plurality of food products as the plurality of food products are moved through the processing zone simultaneously by the conveyor, the data including information regarding (i) a respective type of each of the plurality of food products and (ii) a positioning of the plurality of food products relative to one another; and
variably control a speed of the conveyor based on the data to facilitate variably processing the plurality of food products as the plurality of food products are moved through the processing zone simultaneously by the conveyor to achieve target processing for each of the plurality of food products.

11. The food preparation appliance of claim 10, wherein the sensor includes at least one of a scanner, a camera, a temperature sensor, or a scale.

12. The food preparation appliance of claim 10, wherein the data includes a characteristic of the plurality of food products including at least one of a size, a weight, a temperature, a shape, a color, a texture, a nutrition content, or a number of portions of the plurality of food products.

13. The food preparation appliance of claim 10, wherein the sensor is positioned within the processing zone.

14. The food preparation appliance of claim 10, wherein the sensor includes a plurality of sensors including:
a first sensor positioned proximate the inlet of the housing;
a second sensor positioned within the processing zone; and
a third sensor positioned proximate the outlet of the housing.

15. The food preparation appliance of claim 14, wherein the first sensor is positioned along a lateral side of the conveyor or along a cantilever arm extending laterally across the conveyor.

16. The food preparation appliance of claim 14, wherein the third sensor is positioned along a lateral side of the conveyor or along a cantilever arm extending laterally across the conveyor.

17. A food preparation appliance comprising:
a housing defining an inlet, an outlet, and a processing zone between the inlet and the outlet;
a single conveyor configured to move food products from the inlet, through the processing zone, and to the outlet;
a heating element positioned within the processing zone;
a sensor configured to acquire data regarding (i) a respective type of each of multiple food products and (ii) a positioning of the multiple food products relative to one another spaced along the single conveyor; and
a controller having programmed instructions to control the single conveyor and the heating element to facilitate providing independent zone processing based on the data such that the multiple food products spaced along the single conveyor can be processed simultaneously with different operating parameters as the single conveyor moves the multiple food products through the processing zone simultaneously to achieve target processing for each of the multiple food products.

18. The food preparation appliance of claim 17, wherein the heating element includes a plurality of independently controllable heating elements.

* * * * *